United States Patent
Tanaka et al.

[11] Patent Number: 5,882,473
[45] Date of Patent: Mar. 16, 1999

[54] FABRIC POSITIONING APPARATUS USED IN PRODUCING SYNCHRONOUS BELT

[75] Inventors: Michio Tanaka; Osamu Sakamoto, both of Kobe, Japan

[73] Assignee: Bando Chemical Industries, Ltd., Japan

[21] Appl. No.: 816,422

[22] Filed: Mar. 14, 1997

[30] Foreign Application Priority Data

Mar. 19, 1996 [JP] Japan .................................. 8-063103

[51] Int. Cl.$^6$ ........................... B29D 29/08; B65H 77/00
[52] U.S. Cl. .................... 156/494; 156/138; 242/147 R; 242/156
[58] Field of Search .................................. 156/138, 161, 156/439, 440, 494; 242/147 R, 151, 155 R, 156

[56] References Cited

U.S. PATENT DOCUMENTS

| | | | |
|---|---|---|---|
| 471,571 | 3/1892 | Robinson | 242/155 R |
| 756,751 | 4/1904 | Wallace | 242/156 |
| 2,385,479 | 9/1945 | Underhill | 242/156 |
| 3,108,028 | 10/1963 | Sprunck et al. | 156/440 |
| 4,053,547 | 10/1977 | Redmond | 156/138 |
| 4,952,261 | 8/1990 | Nosaka et al. | 156/138 |
| 4,992,123 | 2/1991 | Cave et al. | 156/439 |
| 4,993,995 | 2/1991 | Okazaki | 474/152 |
| 5,653,095 | 8/1997 | Stamm | 156/494 |

FOREIGN PATENT DOCUMENTS 63-069627 A   3/1988   Japan.

*Primary Examiner*—Steven D. Maki
*Attorney, Agent, or Firm*—Sixbey, Friedman, Leedom & Ferguson, P.C.; Gerald J. Ferguson, Jr.; Tim L. Brackett, Jr.

[57] ABSTRACT

One end of a flexible positioning cord is fixed on one end side of a molding drum and the positioning cord is then pulled from the other end side thereby applying a tension to the positioning cord. The tensed positioning cord presses a joint of an extensible fabric into one of tooth part forming grooves to position it therein. Next, a tension member cord is wound in a spiral form and the tension applied to the positioning cord is then relieved to allow the removal of the positioning cord from the tooth part forming groove. Thereafter, an unvulcanized rubber sheet is wrapped around the extensible fabric wound with the tension member cord, and the resultant substance is then subjected to cure through the application of pressure thereby forming a cylindrical slab. The slab is cut into round pieces at specific widths thereby obtaining synchronous belts. In this manner, there is obtained the synchronous belt in which the joint of the extensible fabric is positioned in the tooth part forming groove of the molding drum so as to avoid movement and is correctly located on a tooth tip end of a tooth part.

4 Claims, 11 Drawing Sheets

FABRIC POSITIONING APPARATUS USED IN PRODUCING SYNCHRONOUS BELT

BACKGROUND OF THE INVENTION

This invention relates to a method of producing a synchronous belt in which the surfaces of tooth parts are covered with an extensible fabric and a fabric positioning apparatus used in the method, and particularly relates to measures for placing a joint of the extensible fabric formed into a cylindrical form by sewing on the tooth tip face of the tooth part of the synchronous belt.

In a typical synchronous belt used as a power transmission belt for vehicle engine and other applications, a tension member cord is embedded in a belt body along a longitudinal direction of the belt, a multiplicity of tooth parts are formed on the belt body at specific intervals along the longitudinal direction of the belt in a single-piece structure integral with the belt body and the extensible fabric is adhered to the surfaces of the tooth parts.

Such a synchronous belt is generally produced in the following manner. First, an extensible fabric is sewed into a cylindrical form thereby forming a joint, and the extensible fabric thus obtained is fit around a molding drum. The outer periphery of the molding drum has a multiplicity of tooth part forming grooves which are formed at specific intervals in a circumferential direction of the molding drum so as to extend in a direction orthogonal to the circumferential direction. Next, a tension member cord is spirally wound around the extensible fabric and an unvulcanized rubber sheet is then wrapped around the extensible fabric wound with the tension member cord. Thereafter, the unvulcanized rubber sheet is subjected to cure through the application of pressure, so that the tooth part forming grooves are filled with parts of the unvulcanized rubber, respectively, thereby forming a cylindrical slab whose inner periphery has a multiplicity of internal teeth extending in a direction orthogonal to the circumferential direction of the slab. The slab thus obtained is cut in round pieces at specific widths. As a result, obtained are synchronous belts in each of which the tension member cord is embedded in the belt body along the longitudinal direction of the belt, the multiplicity of tooth parts are formed on the belt body at specific intervals in the longitudinal direction of the belt in a single-piece structure integral with the belt body and the extensible fabric is adhered to the surfaces of the tooth parts.

Meanwhile, since the joint of the extensible fabric in cylindrical form is generally formed by sewing with a machine sewing thread, if the joint after the formation of a belt is located at a bottom land or a tooth root, a breakage of the machine sewing thread at the joint may occur due to friction, bending, tension or the like of the joint at the time of engagement with a synchronous pulley thereby opening the joint. This exposes a rubber layer of the tooth part through the opening of the joint and brings the rubber layer into direct contact with the synchronous pulley, resulting in ease of production of a crack. Therefore, to avoid such a situation, it is necessary to correctly position the joint on the tooth tip face of the tooth part.

However, in the above-mentioned method of producing a synchronous belt, even if the extensible fabric is positioned, when fit around the molding drum, so that the joint is located at one of the tooth part forming grooves, the joint moves when the tension member cord is wound after that so that the position of the joint is not fixed. This invites the above-described inconvenience.

As a measure for positioning the joint of the extensible fabric, there is proposed a method as disclosed in Japanese Patent Application Laid-Open Gazette No. 63-69627. This method is described bellow.

First, when the extensible fabric is sewed into a cylindrical form, a solid bar is integrally sewed in the joint. Next, one end of the bar is hitched to a flange provided at one end of the molding drum while the other end thereof is fixed by a tape-like substance at the other end of the molding drum.

Thus, the joint is held in the tooth part forming groove of the molding drum together with the bar and at last the joint can be correctly positioned on the tooth tip face of the tooth part of the synchronous belt. After the subsequent step of winding the tension member cord is completed, the bar is pulled out of between the extensible fabric and the tension member cord.

However, the above method disclosed in the gazette has the following problems:

1. The method requires a special technique for integrally sewing the bar in the joint of the extensible fabric.

2. When a plurality of joints exist in one extensible fabric, much time and effort are expended in sewing bars in respective joints and the necessary number of bars increases.

3. The extensible fabric must be carried in integral form with the bar. This increases the weight and therefore invites inconveniences in transportation and storage.

4. The method requires a bar longer than the axial length of the molding drum. Such a long bar is inconvenient to store.

5. The molding drum must be provided with the flange for fixing one end of the bar. This complicates the molding drum configuration.

6. The bar is difficult to pull out of the tooth part forming groove unless pulled out with a large force, because the bar experiences a tension of the machine sewing thread at the time of integrally sewing the bar in the joint and a force of winding the tension member cord. This is a point to which greatest attention should be paid. This further requires a special tool for pulling out the bar from one end side of the molding drum and also requires to provide, on the one end side of the molding drum, a stroke sufficient for pulling out the bar, that is, a space having at least the length of the bar.

To cope with the sixth problem, it can be considered to use the following method. In this method, the bar is not sewed in the joint of the extensible fabric. Instead of this, the joint is pressed from above by the bar so that the joint is held in the tooth part forming groove together with the bar. Thus, since only a force of winding the tension member cord acts on the bar, the bar can be easily pulled out of the tooth part forming groove.

In this method, however, when both ends of the bar are fixed on both end sides of the molding drum, respectively, a middle portion of the bar is lifted outwardly along a radial direction of the molding drum so that the joint cannot entirely be pressed by the bar. This may cause the joint to move when the fabric is wound with the tension member cord, thereby making it difficult to position the joint. Further, even though a force acting on the bar is only a force of winding the tension member cord, the bar cannot absorb the force of winding the tension member cord because of its solidity as well as be tightly bound by the tension member cord. Therefore, a large force is required for pulling the bar out of the tooth part forming groove of the-molding drum. Thus, also in this method, the bar cannot easily be pulled out as in the case of the above-described gazette. Furthermore, this method also has the problem of requiring a space for pulling out the bar as in the case of the above-described gazette.

SUMMARY OF THE INVENTION

In view of many problems above-mentioned, the present invention has been made. An object of the present invention is to securely press a joint of an extensible fabric into a tooth part forming groove of a molding drum to position the joint therein and eliminate the problems occurring in the case of using the above-mentioned bar, resulting in increased productivity of a synchronous belt.

To attain the above object, the present invention is characterized by using as a positioning means a cord which is flexible in a free state but can be made linear like a solid bar at the time of application of a tension.

More specifically, this invention is directed to a method of producing a synchronous belt in which a tension member cord is embedded in a belt body along a longitudinal direction of the belt, a multiplicity of tooth parts are formed on the belt body at specific intervals along the longitudinal direction of the belt in a single-piece structure integral with the belt body and the extensible fabric is adhered to the surfaces of the tooth parts, and is directed to a fabric positioning apparatus used in the method. This invention takes the following solutions.

The first to eighth solutions relate to a method of producing a synchronous belt.

In the first solution, first prepared are an extensible fabric sewed into a cylindrical form thereby forming a joint and a molding drum. The molding drum has a multiplicity of tooth part forming grooves formed on the outer periphery of the molding drum at specific intervals in a circumferential direction of the molding drum so as to extend in a direction orthogonal to the circumferential direction. Next, the extensible fabric is fit around the molding drum so as to place the joint along one of the tooth part forming grooves. Thereafter, a flexible positioning cord is placed on the joint of the extensible fabric, one end thereof is fixed on one end side of the molding drum and the other end is then pulled from the other end side of the molding drum thereby applying a tension to the positioning cord. The positioning cord under the tension presses the joint into the tooth part forming groove to position the joint therein so as to avoid movement. Then, the tension member cord is wound around the extensible fabric in a spiral form, the tension applied to the positioning cord is relieved and the positioning cord is then removed from the tooth part forming groove. Thereafter, an unvulcanized rubber sheet is wrapped around the extensible fabric wound with the tension member cord, and the unvulcanized rubber sheet is subjected to cure through the application of pressure so that the tooth part forming grooves are filled with parts of the unvulcanized rubber sheet, respectively, thereby forming a cylindrical slab whose inner periphery has a multiplicity of internal teeth extending in a direction orthogonal to the circumferential direction of the slab. The slab is cut into round pieces at specific widths thereby obtaining synchronous belts, in each of which the tension member cord is embedded in the belt body along the longitudinal direction of the belt, the multiplicity of tooth parts are formed on the belt body at specific intervals along the longitudinal direction of the belt in a single-piece structure integral with the belt body and the extensible fabric is adhered to the surfaces of the tooth parts.

Under the above structure of the first solution, when a tension acts on the positioning cord, the positioning cord becomes tense in a linear form and fits on the entire joint of the extensible fabric thanks to its inherent flexibility, whereby the entire joint is securely pressed into the tooth part forming groove by the positioning cord so as not to move off therefrom. As a result, the joint is correctly positioned in the tooth part forming groove.

Further, when the tension of the positioning cord is relieved after the winding of the tension member cord, the positioning cord is released from its tense state to slack into an initial flexible state. In this state, the positioning cord can be removed with a simple operation of lightly pulling it from one end side of the molding drum. This dispenses with a wide space for pulling out the positioning means. At this time, even if the force of winding the tension member cord acts on the positioning cord, the positioning cord changes the form in its radial direction to absorb the force of winding the tension member cord, thereby damping a binding force by the tension member cord. As a result, the positioning cord can be easily pulled out with a small force. This dispenses with a special tool necessary for pulling out the solid bar.

Furthermore, since the solid bar is not used, this eliminates all the disadvantages of the prior arts, such as a special technique of integrally sewing the bar in the joint, which is conventionally required, a complication of sewing works to a plurality of joints, inconveniences of transportation and storage of the extensible fabrics in association with increased weight, a complication of storage of a long bar and the complexity of a molding drum configuration in association with an additional flange of the molding drum.

The second solution is characterized in that in the first solution, the positioning cord is made of synthetic fibers.

The third solution is characterized in that in the second solution, the synthetic fibers are selected among nylon fibers, aramid fibers and polyester fibers.

Under the above structures of the second and third solutions, the positioning cord is much easy to slide on the extensible fabric and the tension member cord thanks to its material characteristic. This further reduces the resistance to the pulling of the positioning cord, thereby further facilitating the work of pulling out the positioning cord.

The fourth solution is characterized in that in the first solution, the positioning cord is a braid formed of a plurality of filament yarns.

Under the above structure of the fourth solution, even if the positioning cord is repeatedly used, it is prevented from untwisting and loosening as in the case of a twist cord. Accordingly, the durability and strength of the positioning cord can be sufficiently secured.

The fifth solution is characterized in that in the fourth solution, the braid is a tubular braid.

Under the structure of the fifth solution, since the tubular braid can largely change the form in its radial direction due to the existence of a hollow formed inside thereof, the tubular braid sufficiently absorbs the force of winding the tension member cord which acts thereon so that the binding force on the tubular braid is further damped. This further facilitates the work of pulling out the tubular braid.

The sixth solution is characterized in that in the first solution, the positioning cord is formed so as to avoid contact with the tension member cord in a state of pressing the joint into the tooth part forming groove to position the joint therein.

The seventh solution is characterized in that in the first solution, the positioning cord is formed so as to come into contact with the tension member cord to the extent of not bulging the tension member cord in a state of pressing the joint into the tooth part forming groove to position the joint therein.

Under the above structures of the sixth and seventh solutions, the tension member cord does not undulate at the joint but is regularly embedded over the entire belt. In the sixth solution, since there is no resistance to the pulling of the positioning cord, the work of pulling out the positioning cord can be further facilitated. In the seventh solution, since there is an extremely little resistance to the pulling of the positioning cord, the positioning cord can be pulled out with a slightly small force.

The eighth solution is characterized in that in the first solution, the diameter of the positioning cord is set at a dimension corresponding to 30 to 80% of the depth of the tooth part forming groove.

Under the structure of the eighth solution, operations and effects of the sixth and seventh solutions can be ensured.

The ninth to twelfth solutions relate to a fabric positioning apparatus used in the method of producing a synchronous belt.

The ninth solution is characterized in that a fabric positioning apparatus used in the method of producing a synchronous belt according to any one of the first to eight solutions comprises: fixing means which is detachably attached on one end side of the molding drum and fixes one end of the positioning cord on the one end side of the molding drum; and tension applying means which is detachably attached on the other end side of the molding drum and pulls the other end of the positioning cord whose another end is fixed on the one end side of the molding drum by the fixing means from the other end side of the molding drum, whereby the positioning cord presses the joint of the fabric into the tooth part forming groove by a tension applied to the positioning cord to position the joint therein so as to avoid a movement of the joint.

Under the above structure of the ninth solution, with a simple operation of placing the positioning cord on the joint and operating the tension applying means, the joint can be easily positioned. Further, since the fixing means and tension applying means are detachable, this eliminates the need for changing the molding drum configuration and makes it possible to apply the apparatus to the existing molding drum, resulting in increased general versatility.

The tenth solution is characterized in that in the ninth solution, a first shaft is outwardly protruded on one end surface of the molding drum, a second shaft is outwardly protruded on the other end surface of the molding drum, the fixing means is a fixing tool in which one end thereof curves in the shape of U to form a hook for the hitch to the first shaft and the other end is folded back to form a fixing part for fixing one end of the positioning cord, and the tension applying means comprises a hook member curving in the entire shape of U so as to be hitched to the second shaft and a roll-up device for rolling up the positioning cord from the other end side of the positioning cord, the roll-up device being provided at one end of the hook member.

Under the structure of the tenth solution, with a simple operation of hitching the hook of the fixing tool (fixing means) to the first shaft and hitching the hook member of the tension applying means to the second shaft, the fixing means and tension applying means can be set. This facilitates the positioning of the extensible fabric.

In the eleventh solution, the roll-up device of the tenth solution is composed as follows. A roll-up drum wound with the positioning cord is rotatably supported on a frame through a rotary shaft. A first operating lever is rotatably provided at one end of the rotary shaft. A first ratchet mechanism is provided at the one end of the rotary shaft to transmit only a rotational force in a direction of rolling up the positioning cord of the first operating lever to the rotary shaft and to prevent the transmission of the opposite rotational force in a direction of drawing out the positioning cord to the rotary shaft. Further, a second ratchet mechanism is provided at the other end of the rotary shaft to allow the roll-up drum to rotate only in the direction of rolling up the positioning cord and to restrict the reverse rotation of the roll-up drum in the direction of drawing out the positioning cord.

In the twelfth solution, the first ratchet mechanism of the eleventh solution is composed as follows. A first ratchet gear is fixed to one end of the rotary shaft. A first pawl is fixed to the first operating lever so as to be engaged with the first ratchet gear by a rotational operation of the first operating lever in the direction of rolling up the positioning cord and so as to be disengaged from the first ratchet gear by a reverse rotational operation of the first operating lever in the direction of drawing out the positioning cord. The second ratchet mechanism is composed as follows. A second ratchet gear is fixed to the other end of the rotary shaft. A second pawl is rotatably provided at the fixed side. A spring is provided for pulling the second pawl to engage the second pawl with the second ratchet gear thereby allowing the roll-up drum to rotate only in the direction of rolling up the positioning cord. Further, a second operating lever is provided at the second pawl so that the second pawl is disengaged from the second ratchet gear against a resilient force of the spring by a rotational operation of the second operating lever.

Under the structures of the eleventh and twelfth solutions, by operating the first and second operating levers, operations of rolling up the positioning cord and drawing out it can be securely executed with ease.

BEST MODE FOR CARRYING OUT THE INVENTION

Description is made below about embodiments of the present invention with reference to the drawings.

Figure 10:
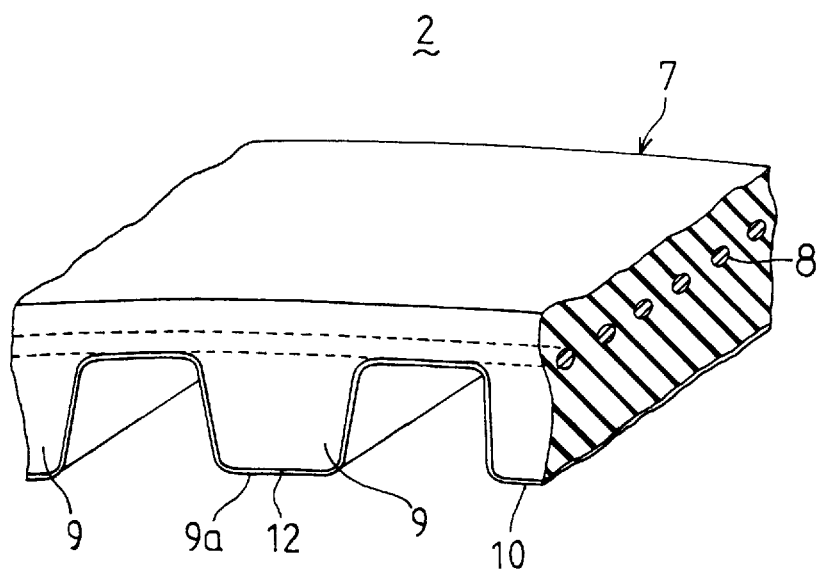
FIG. 10 is a perspective view showing a part of a synchronous belt.

FIG. 10 shows a synchronous belt 2 used as a power transmission belt for vehicle engine and other applications. Prior to explanation about a method of producing the synchronous belt 2 and a fabric positioning apparatus used in the method, the structure of the synchronous belt 2 is first described.

The synchronous belt 2 includes a belt body 7. A tension member cord 8 is embedded in the belt body 7 along the longitudinal direction of the belt. On one surface of the belt body 7 (lower surface in FIG. 10), a multiplicity of tooth parts 9 are formed at specific intervals in the longitudinal direction of the belt in a single-piece structure integral with the belt body 7. An extensible fabric 10 is adhered to the surfaces of the tooth parts 9.

The belt body 7 and the tooth parts 9 are formed of single material selected among natural rubber (NR), styrene-butadiene rubber (SBR), chloroprene rubber (CR), acrylonitrile-butadiene rubber (NBR) and butyl rubber (IIR) or a rubber blend of such kind of rubbers. The belt body 7 and the tooth parts 9 are treated, at the stage of belt production, in the form of an unvulcanized rubber sheet having a uniform thickness.

The tension member cord 8 is composed of a low-elongation high-strength tension member rope made of glass fibers, aromatic polyamide fibers, carbon fibers, a steel wire or the like.

The extensible fabric 10 is a fabric woven by warp and weft yarns so as to satisfy the wear resistance and the coefficient of friction required as a fabric for synchronous belt 2. For those yarns, yarns made of cotton fibers, polyester fibers, nylon fibers, aramid fibers or the like or blended yarns are used singly or in combination. In particular, for yarns oriented in the longitudinal direction of the belt, extensible yarns such as woollie nylon yarns are used. In producing a belt, the extensible fabric 10 is used in the form of a cylindrical fabric that a single square fabric is sewed into a cylindrical form and therefore has a joint 12. The joint 12 is stitched by a machine sewing thread 13 (See FIGS. 1 and 2) using a filament twist yarn or a mono-filament yarn made of nylon, polyester, polypropylene, aramid and the like singly or in combination.

For production of the synchronous belt 2, the above-mentioned cylindrical extensible fabric 10, the molding drum 1 and a fabric positioning apparatus 21 (See FIGS. 1–4) are prepared.

Figure 1:
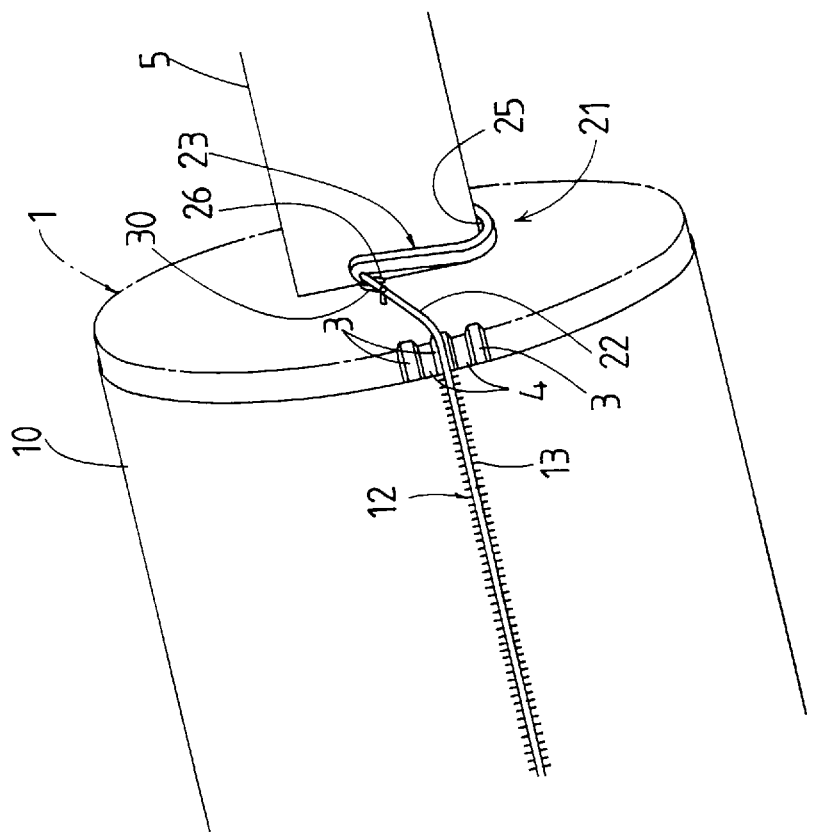
FIG. 1 is a perspective view of one end part of a molding drum, in which a joint of an extensible fabric is positioned in a tooth part forming groove by a positioning cord.
Figure 2:
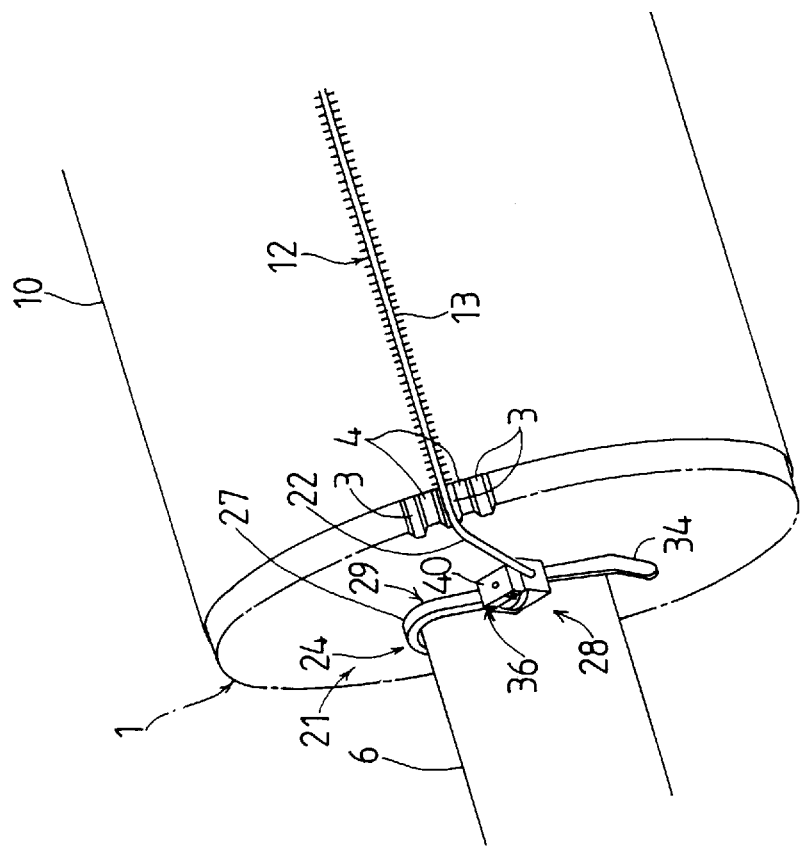
FIG. 2 is a perspective view of the other end part of the molding drum, in which the joint of the extensible fabric is positioned in the tooth part forming groove by the positioning cord.

As shown in FIGS. 1 and 2, the molding drum 1 is formed into a cylindrical form. On the outer periphery thereof, in order to form the tooth parts 9 of the synchronous belt 2, a multiplicity of tooth part forming grooves 3 are formed with recesses 4 left therebetween at specific intervals in the circumferential direction of the belt so as to extend in a direction orthogonal to the circumferential direction (in an axial direction). On the surface of one end (right end in FIG. 1) of the molding drum 1, a first shaft 5 is protruded outwardly. On the surface of the other end (left end in FIG. 2) of the molding drum 1, a second shaft 6 is protruded outwardly. These first and second shafts 5, 6 supports the molding drum 1.

Figure 3:
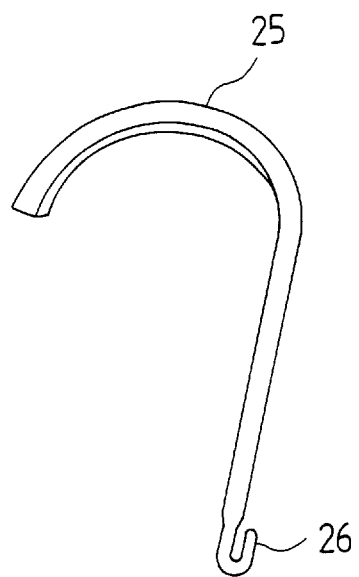
FIG. 3 is a perspective view of a fixing tool.

The fabric positioning apparatus 21 has a fixing tool 23 as a fixing means and a tension applying tool 24 as a tension applying means. As shown in FIG. 3, the fixing tool 23 curves at one end thereof in the shape of U thereby forming a hook 25 to be hitched to the first shaft 5 of the molding drum 1, and is folded back at the other end in the shape of a hair pin thereby forming a J-shaped fixing part 26 for fixing one end of the below-mentioned positioning cord 22 thereto. The fixing tool 23 is detachably attached on one end side of the molding drum 1 in such a manner that the hook 25 is hitched to the first shaft 5. In this state, one end of the positioning cord 22 is fixed on the one end side of the molding drum 1 in such a manner that the one end of the positioning cord 22 is connected to the fixing part 26.

Figure 4:
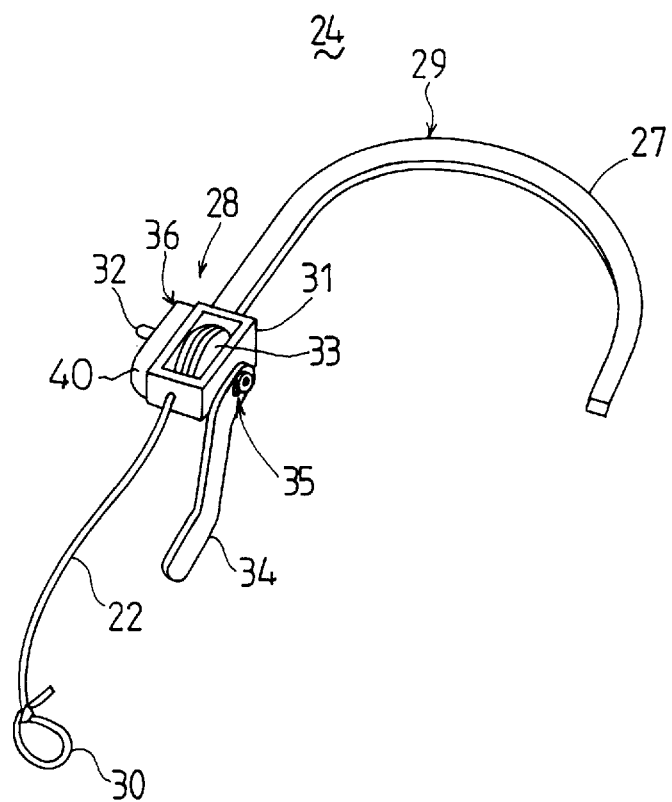
FIG. 4 is a perspective view of a tension applying tool.

As shown in FIG. 4, the tension applying tool 24 has a hook member 27 which curves in the shape of U as a whole so as to be hitched to the second shaft 6. The tension applying tool 24 is detachably attached on the other end side of the molding drum 1 in such a manner that the hook member 27 is hitched to the second shaft 6. A roll-up device 28 is attached to one end of the hook member 27. The roll-up device 28 has a frame 31 to which a rotary shaft 32 is rotatably mounted. A roll-up drum 33 is attached to the rotary shaft 32 in one unit. Thereby, the roll-up drum 33 is rotatably supported to the frame 31 through the rotary shaft 32. The other end part of the positioning cord 22 is rolled around the roll-up drum 33. The roll-up drum 33 rolls up or draws out the positioning cord 22 by rotation in the normal or reverse direction. An annular hook 30 is formed at one end of the positioning cord 22. The annular hook 30 is hitched to the fixing part 26 of the fixing tool 23 so as not to fall, thereby connecting the annular hook 30 to the fixing part 26.

Figure 7:
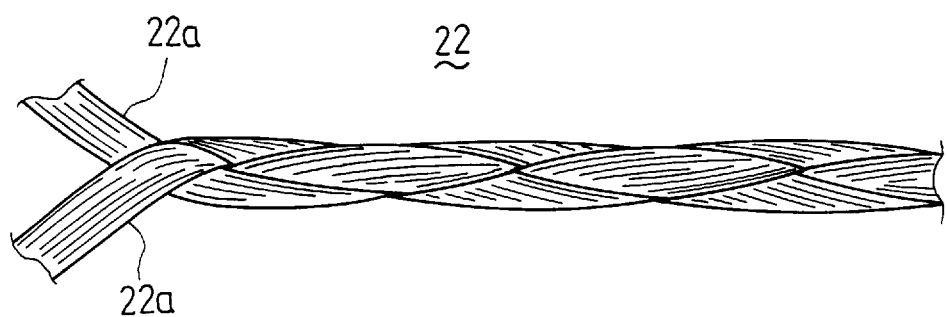
FIG. 7 is an enlarged diagram of the positioning cord.

The positioning cord 22 is for pressing the joint 12 of the extensible fabric 10 into the tooth part forming groove 3 by its tension to position the joint 12 therein so as to avoid the movement of the joint 12. For example, the positioning cord 22 is formed of a tubular braid that four or more filament yarns 22a of nylon fibers are braided into a cylindrical form (See FIG. 7) by a braiding machine. A hollow (not shown) is formed inside the positioning cord 22. The tubular braid has outstandingly excellent flex fatigue resistance because of its structural characteristic. Therefore, even the tubular braid is repeatedly used, it can be prevented from being untwisted and loosened as in a sennit and the like, thereby securely obtaining sufficient durability and strength. The diameter of the positioning cord 22 is preferably about 1.8 to 2.2 mm, but is not limited to the range. Further, the positioning cord 22 is not limited to the tubular braid, and may be a flat braid or a cord other than the braid. Furthermore, the positioning cord 22 may be made of fibers other than nylon fibers, such as whisker fibers, glass fibers and metallic fibers. In particular, if the positioning cord 22 is made of synthetic fibers, it is very easy to slide on the extensible fabric 10 and the tension member cord 8. This further reduces the resistance to pull out the positioning cord 22, thereby further facilitating the work of pulling out the positioning cord 22.

Figure 8:
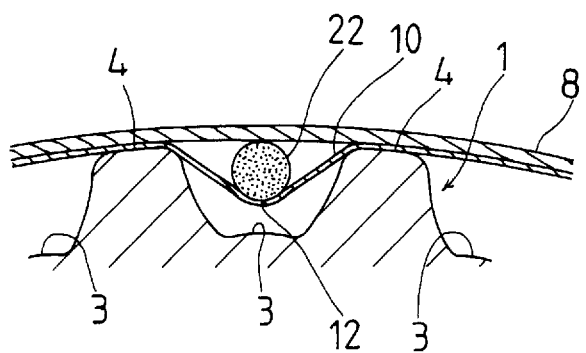
FIG. 8 is a longitudinal cross-sectional view of the vicinity of an outer periphery of the molding drum after a step of winding a tension member cord is completed.
Figure 9:
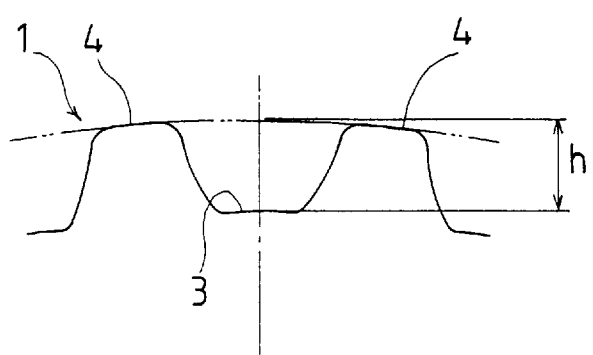
FIG. 9 is an enlarged schematic diagram of a tooth part forming groove of the molding drum.

As shown in FIG. 8, in the state that the positioning cord 22 presses the joint 12 of the extensible fabric 10 into the tooth part forming groove 3 to position the joint 12, the positioning cord 22 comes into contact with the tension member cord 8 to the extent of not bulging the tension member cord 8. Though it depends on an amount that the extensible fabric 10 is pressed by a tension of the positioning cord 22, in general, the uppermost of the diameter of the positioning cord 22 is set at the dimension corresponding to 80% or less of the depth h of the tooth part forming groove 3 of the molding drum 1 (See FIG. 9). On the other hand, the lowermost of the diameter of the positioning cord 22 is set at the dimension corresponding to 30% or more of the depth h of the tooth part forming groove 3 of the molding drum 1 in view of the strength and other-conditions, though it depends on the material of the positioning cord 22. The positioning cord 22 may be set so as to avoid contact with the tension member cord 8 in the state that it presses the joint 12 of the extensible fabric 10 into the tooth part forming groove 3 to position the joint 12.

Figure 5:
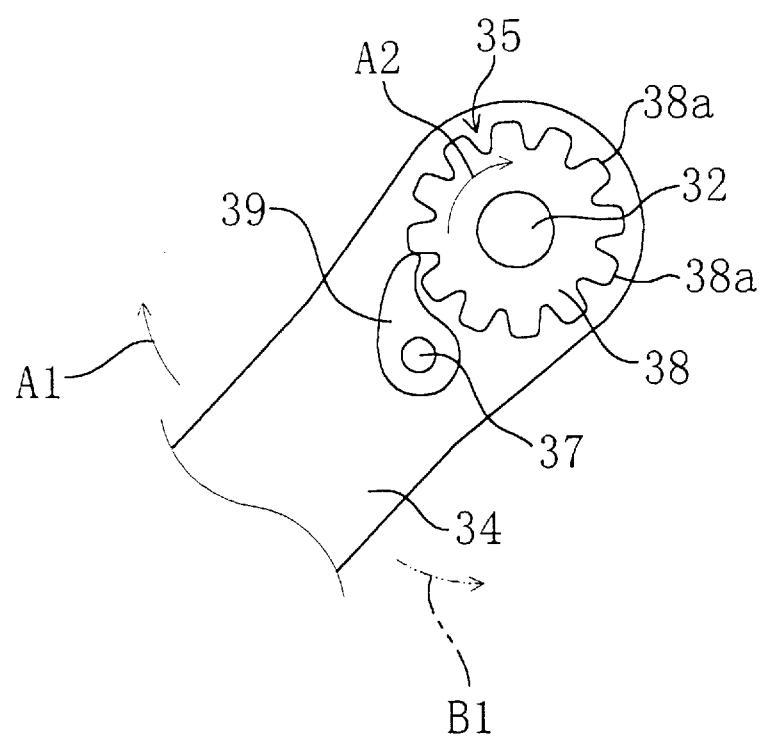
FIG. 5 is a schematic diagram showing the structure of a first ratchet mechanism.

At one end of the rotary shaft 32 of the roll-up device 28 (right end thereof in FIG. 4), a first operating lever 34 is rotatably attached. At the side of the first operating lever 34, a first ratchet mechanism 35 is mounted. As shown in FIG. 5, the first ratchet mechanism 35 includes a first ratchet gear 38 fixed to one end of the rotary shaft 32 and a first pawl 39 fixed to the first operating lever 34 by a pin 37. The first pawl 39 is engaged with teeth 38a of the first ratchet gear 38 by a rotational operation of the first operating lever 34 in a direction of rolling up the positioning cord 22 (direction of arrow A1), and is disengaged from the teeth 38a of the first ratchet gear 38 by the opposite rotational operation of the first operating lever 34 in a direction of drawing out the positioning cord 22 (direction of arrow B1). Accordingly, the first ratchet mechanism 35 transmits to the rotary shaft 32 only a rotational force in the direction of rolling up the positioning cord of the first operating lever 34 and does not transmit to the rotary shaft 32 a reverse rotational force in the direction of drawing out the positioning cord of the first operating lever 34. The first ratchet mechanism 35 intermittently rotates the first ratchet gear 38 in the direction of rolling up the positioning cord (direction of arrow A2) by repeated rotational operations of the first operating lever 34, thereby rolling up the positioning cord 22 around the roll-up drum 33.

Figure 6:
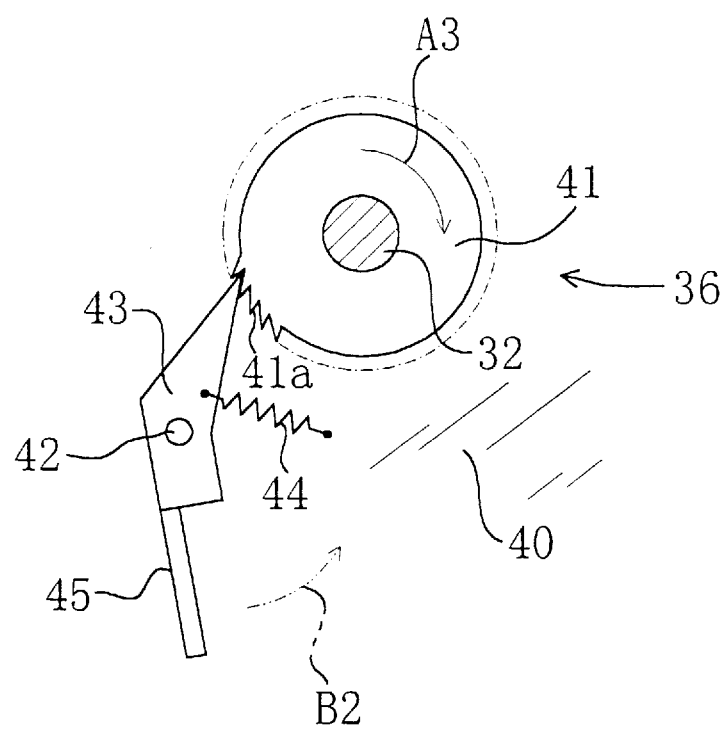
FIG. 6 is a schematic diagram showing the structure of a second ratchet mechanism.

A cover 40 is attached to the side surface opposite to the first ratchet mechanism 35 of the frame 31. In the cover 40, a second ratchet mechanism 36 is mounted to the other end of the rotary shaft 32 (left end thereof in FIG. 4). As shown in FIG. 6, the second ratchet mechanism 36 includes a second ratchet gear 41 fixed to the other end of the rotary shaft 32 and a second pawl 43 provided on the inner wall of the cover 40 as the fixed side so as to be rotatable via a shaft 42. One end of a spring 44 is connected to the middle portion of the second pawl 43, while the other end of the spring 44 is connected to the inner wall of the cover 40. Thus, a resilient force of the spring 44 acts to pull the second pawl 43 to engage it with teeth 41a of the second ratchet gear 41 thereby allowing the roll-up drum 33 to rotate only in the direction of rolling up the positioning cord (direction of arrow A3). Further, a second operating lever 45 is attached to the second pawl 43, and the end of the second operating lever 45 protrudes outwardly from the cover 40. A rotational operation of the second operating lever 45 in a direction of arrow B2 disengages the second pawl 43 from the second ratchet gear 41 against the resilient force of the spring 44. In short, the second ratchet gear 41 allows the roll-up drum 33 to rotate only in the direction of rolling up the positioning cord while restricting a reverse rotation of the roll-up drum 33 in the direction of drawing out the positioning cord, or preventing the roll-up drum 33 from rotating in the direction of drawing out the positioning cord in the case that the first operating lever 34 of the first ratchet mechanism 35 is operated in the direction of rolling up the positioning cord and is thereafter operated back for the shift of the next operation.

Accordingly, in the state that the positioning cord 22 is put on the joint 12 of the extensible fabric 10 along the tooth part forming groove 3 of the molding drum 1 and the annular hook 30 of the positioning cord 22 is fixed to the fixing part 26 of the fixing tool 23, when the first operating lever 34 of the first ratchet mechanism 35 repeatedly undergoes rotational operations, the positioning cord 22 is rolled up on the roll-up drum 33 to become tense. The tension of the positioning cord 22 allows the positioning cord 22 to press the joint 12 of the extensible fabric 10 into the tooth part forming groove 3 to position the joint 12 so as to avoid its movement.

Removal of the positioning cord 22 is made as follows. The first operating lever 34 is rotated in the direction of arrow B1 so that the first pawl 39 is disengaged from the teeth 38a of the first ratchet gear 38. The second operating lever 45 is rotated in the direction of arrow B2 so that the second pawl 43 is disengaged from the teeth 41a of the second ratchet gear 41. Thereby, the roll-up drum 33 rotates in the direction of drawing out the positioning cord 22 so that the positioning cord 22 slacks. In this state, the annular hook 30 of the positioning cord 22 is taken off the fixing part 26 of the fixing tool 23, and the first and second operating levers 34, 45 then undergo respective rotational operations again, so that the first pawl 39 is engaged with the teeth 38a of the first ratchet gear 38 and the second pawl 43 is engaged with the teeth 41a of the second ratchet gear 41. In this state, since the drawing of the positioning cord 22 is restricted, the positioning cord 22 can be pulled out by detaching the tension applying tool 24 from the second shaft 6 and pulling it.

Next, description is made about an example of the method of producing a synchronous belt 2.

First, a cylindrical extensible fabric 10 is fit around the molding drum 1 from the first shaft 5 side or the second shaft 6 side. At this time, the joint 12 of the extensible fabric 10 is placed along arbitrary one of the tooth part forming grooves 3 of the molding drum 1.

Second, the hook 24 of the fixing tool 23 is hitched to the first shaft 5 of the molding drum 1 thereby setting the fixing tool 23 on one end side of the molding drum 1, and the hook member 27 of the tension applying tool 24 is hitched to the second shaft 6 of the molding drum 1 thereby setting the tension applying tool 24 on the other end side of the molding drum 1.

Third, the first and second operating levers 34, 45 of the first ratchet mechanism 35 of the tension applying tool 24 undergo respective rotational operations so that the first and second pawls 39, 43 are disengaged from the first and second ratchet gears 38, 41, respectively. Then, the positioning cord 22 is drawn out of the roll-up drum 33 and is placed on the joint 12 of the extensible fabric 10 (i.e., on the tooth part forming groove 3).

Fourthly, the annular hook 30 of the positioning cord 22 is hitched to the fixing part 26 of the fixing tool 23 thereby fixing the positioning cord 22 thereto.

Fifthly, the first operating lever 34 repeatedly undergoes rotational operations within the range of a defined rotational angle so that the other end side part of the positioning cord 22 is rolled up on the roll-up drum 33, thereby pulling the positioning cord 22 to apply a tension thereto. The applied tension acts on the joint 12 of the extensible fabric 10 to press the joint 12 into the tooth part forming groove 3, thereby securely positioning and holding the joint 12 so as to avoid its movement.

At this time, though the positioning cord 22 becomes tense in a linear form, it can fit on the entire joint 12 of the extensible fabric 10 because of its inherent flexibility. Thereby, the entire joint 12 is securely pressed into the tooth part forming groove 3 by the positioning cord 22 so as not to move off from the tooth part forming groove 3. In this manner, the joint 12 can be correctly positioned and held in the tooth part forming groove 3.

Sixthly, in the above state, a tension member cord 8 under uniform tension is spirally wound around the extensible fabric 10. The force of winding the tension member cord 8 sets the joint 12 in the tooth part forming groove 3. The positioning cord 22 is set to have a diameter of 30–80% of the depth h of the tooth part forming groove 3. Therefore, the positioning cord 22 can avoid contact with the tension member cord 8, or even if it contacts the tension member cord 8, the contact is limited to the extent of not bulging the tension member cord 8. In addition, the strength of the positioning cord 22 can be secured moderately. Accordingly, the force of winding the tension member cord 8 which acts on the positioning cord 22 can be suppressed at a minimum, so that the tension member cord 8 can be regularly embedded over the entire belt body without undulating at the joint 12.

Seventhly, the first and second operating levers 34, 45 undergo respective rotational operations in reverse directions so that the first and second pawls 39, 43 are disengaged from the first and second ratchet gears 38, 41, thereby slacking the positioning cord 22. Then, the annular hook 30 is taken off the fixing part 26 or is cut off.

Thereby, a tension applied to the positioning cord 22 is relieved so that the positioning cord 22 further slacks into an initial flexible state.

Eighthly, the tension applying tool 24 is detached from the second shaft 6 of the molding drum 1. Then, the first and second operating levers 34, 45 undergo respective rotational operations in normal directions so that the first and second pawls 39, 43 are engaged with the first and second ratchet gears 38, 41, respectively. Next, when the tension applying tool 24 is pulled, the positioning cord 22 is pulled out of between the extensible fabric 10 and the tension member cord 8.

At this time, since the positioning cord 22 displays its inherent flexibility because it is released from the tension having been applied thereto, even if the force of winding the tension member cord 8 acts on the positioning cord 22, the positioning cord 22 changes the form in its radial direction to absorb the force of winding the tension member cord 8 thereby damping the binding force of the tension member cord. This offers little resistance to the pulling out the positioning cord 22 thereby dispensing with a large force as in the case of pulling out a solid bar. In other words, the positioning cord 22 can be drawn out with a slightly small force. In addition, a special tool for puling out the positioning cord 22 is dispensed with. Further, since the positioning cord 22 slacks because it is released from the tension having been applied thereto, there is no need to provide a space for pulling out the positioning cord 22, which corresponds to the length of the positioning cord 22, on the other end side of the molding drum 1. This makes it possible to pull out the positioning cord 22 in a saved space. In particular, if the positioning cord 22 is formed of a tubular braid, it can largely change the form in its radial direction because of a hollow formed inside thereof. The hollow sufficiently absorbs the force of winding the tension member cord which acts on the positioning cord 22 to further damp the binding force on the tubular braid. This further facilitates the work of pulling out the positioning cord 22.

Furthermore, since the conventional solid bar is not used, this eliminates all the disadvantages of the prior arts, such as a special technique of integrally sewing the solid bar in the joint, which is conventionally required, a complication of sewing works to a plurality of joints, inconveniences of transportation and storage of the extensible fabrics in association with increased weight, a complication of storage of a long bar and the complexity of a molding drum configuration in association with an additional flange of the molding drum.

Figure 11:
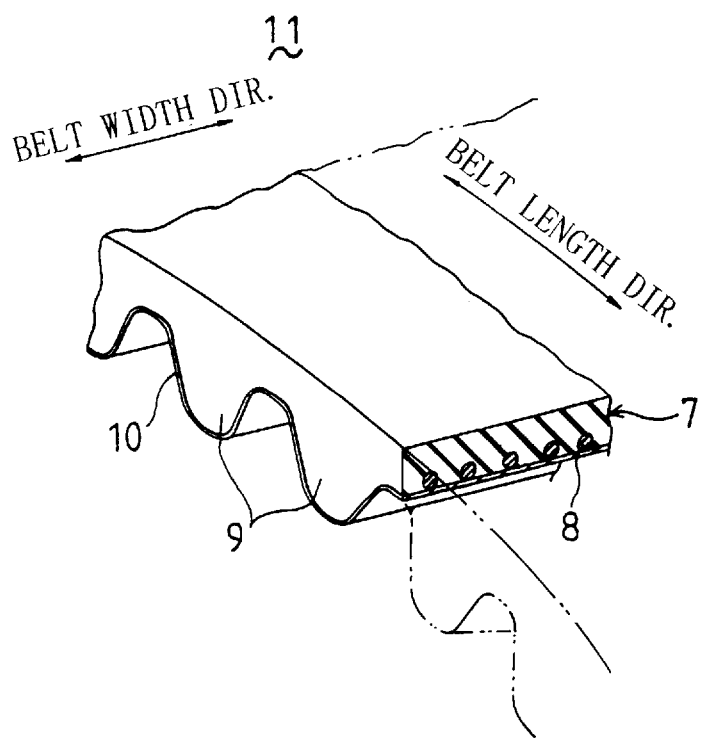
FIG. 11 is a perspective view showing a part of a slab removed from the molding drum.

Ninthly, an unvulcanized rubber sheet is wrapped around the fabric 10 wound with the tension member cord 8 and the resultant substance is subjected to cure through the application of pressure, thereby forming a cylindrical slab 11 having the inner periphery with internal teeth formed at specific intervals (corresponding to tooth parts 9 of a synchronous belt 2) (See FIG. 11). The slab 11 is removed from the molding drum 1 and is cut in round pieces at specific widths. As a result, there is obtained a synchronous belt 2 in which the tension member cord 8 is embedded in a belt body 7 along a longitudinal direction of the belt, a multiplicity of tooth parts 9 are formed on the belt body 7 at specific intervals along the longitudinal direction of the belt in a single-piece structure integral with the belt body 7 and the extensible fabric 10 is adhered to the surfaces of the tooth parts 9. In the synchronous belt 2 thus obtained, the joint 12 of the extensible fabric 10 is correctly located on the tooth tip face 9a of the tooth part 9.

What is claimed is:

1. A fabric positioning apparatus for positioning a fabric including a joint relative to a molding drum, having a multiplicity of tooth part forming grooves, during production of a synchronous belt, comprising:

a flexible positioning cord having sufficient flexibility and capable of being easily removed from one of the tooth part forming grooves after the fabric is positioned;

fixing means which is detachably attached to one end side of the molding drum and fixes one end of the positioning cord on the one end side of the molding drum; and tension applying means which is detachably attached to the other end side of the molding drum and pulls the other end of the positioning cord whose one end is fixed to the one end side of the molding drum by the fixing means on the other end side of the molding drum, whereby the positioning cord presses the joint of the fabric into one of the tooth part forming grooves by a tension applied to the positioning cord to position the joint therein so as to avoid a movement of the joint.

2. A fabric positioning apparatus for positioning a fabric including a joint relative to a molding drum, having a multiplicity of tooth part forming grooves, during production of a synchronous belt, comprising:

a flexible positioning cord having sufficient flexibility and capable of being easily removed from one of the tooth part forming grooves after the fabric is positioned;

fixing means which is detachably attached to one end side of the molding drum and fixes one end of the positioning cord on the one end side of the molding drum;

tension applying means which is detachably attached to the other end side of the molding drum and pulls the other end of the positioning cord whose one end is fixed to the one end side of the molding drum by the fixing means on the other end side of the molding drum, whereby the positioning cord presses the joint of the fabric into one of the tooth part forming grooves by a tension applied to the positioning cord to position the joint therein so as to avoid a movement of the joint;

wherein a first shaft is outwardly protruded on one end surface of the molding drum and a second shaft is outwardly protruded on the other end surface of the molding drum, said fixing means being a fixing tool in which one end thereof curves in the shape of U to form a hook so as to be hitched to the first shaft and the other end is folded back to form a fixing part for fixing one end of the positioning cord, and said tension applying means comprising a hook member curving in the entire shape of U so as to be hitched to the second shaft and a roll-up device for rolling up the positioning cord, the roll-up device being provided at one end of the hook member.

3. A fabric positioning apparatus for positioning a fabric including a joint relative to a molding drum, having a multiplicity of tooth part forming grooves, during production of a synchronous belt, comprising:

a flexible positioning cord having sufficient flexibility and capable of being easily removed from one of the tooth part forming grooves after the fabric is positioned;

fixing means which is detachably attached to one end side of the molding drum and fixes one end of the positioning cord on the one end side of the molding drum;

tension applying means which is detachably attached to the other end side of the molding drum and pulls the other end of the positioning cord whose one end is fixed to the one end side of the molding drum by the fixing means on the other end side of the molding drum, whereby the positioning cord presses the joint of the fabric into one of the tooth part forming grooves by a tension applied to the positioning cord to position the joint therein so as to avoid a movement of the joint;

wherein a first shaft is outwardly protruded on one end surface of the molding drum and a second shaft is outwardly protruded on the other end surface of the molding drum, said fixing means being a fixing tool in which one end thereof curves in the shape of U to form a hook so as to be hitched to the first shaft and the other end is folded back to form a fixing part for fixing one end of the positioning cord, and said tension applying means comprising a hook member curving in the entire shape of U so as to be hitched to the second shaft and a roll-up device for rolling up the positioning cord, the roll-up device being provided at one end of the hook member;

wherein the roll-up device includes a roll-up drum which is rotatably supported on a frame through a rotary shaft and is wound with the positioning cord, a first operating lever rotatably provided at one end of the rotary shaft, a first ratchet mechanism provided at the one end of the rotary shaft to transmit only a rotational force to the rotary shaft in a direction of rolling up the positioning cord and to prevent the transmission of an opposite rotational force to the rotary shaft in a direction of drawing out the positioning cord and a second ratchet mechanism provided at the other end of the rotary shaft to allow the roll-up drum to rotate only in the direction of rolling up the positioning cord and to restrict a reverse rotation of the roll-up drum in the direction of drawing out the positioning cord.

4. A fabric positioning apparatus for positioning a fabric including a joint relative to a molding drum, having a multiplicity of tooth part forming grooves, during production of a synchronous belt, comprising:

a flexible positioning cord having sufficient flexibility and capable of being easily removed from one of the tooth part forming grooves after the fabric is positioned;

fixing means which is detachably attached to one end side of the molding drum and fixes one end of the positioning cord on the one end side of the molding drum;

tension applying means which is detachably attached to the other end side of the molding drum and pulls the other end of the positioning cord whose one end is fixed to the one end side of the molding drum by the fixing means on the other end side of the molding drum, whereby the positioning cord presses the joint of the fabric into one of the tooth part forming grooves by a tension applied to the positioning cord to position the joint therein so as to avoid a movement of the joint;

wherein a first shaft is outwardly protruded on one end surface of the molding drum and a second shaft is outwardly protruded on the other end surface of the molding drum, said fixing means being a fixing tool in which one end thereof curves in the shape of U to form a hook so as to be hitched to the first shaft and the other end is folded back to form a fixing part for fixing one end of the positioning cord, and said tension applying means comprising a hook member curving in the entire shape of U so as to be hitched to the second shaft and a roll-up device for rolling up the positioning cord, the roll-up device being provided at one end of the hook member;

wherein the roll-up device includes a roll-up drum which is rotatably supported on a frame through a rotary shaft and is wound with the positioning cord, a first operating lever rotatably provided at one end of the rotary shaft, a first ratchet mechanism provided at the one end of the rotary shaft to transmit only a rotational force to the rotary shaft in a direction of rolling up the positioning cord and to prevent the transmission of an opposite rotational force to the rotary shaft in a direction of drawing out the positioning cord and a second ratchet mechanism provided at the other end of the rotary shaft to allow the roll-up drum to rotate only in the direction of rolling up the positioning cord and to restrict a reverse rotation of the roll-up drum in the direction of drawing out the positioning cord;

wherein the first ratchet mechanism is composed of a first ratchet gear fixed to one end of the rotary shaft and a first pawl fixed to the first operating lever so as to be locked with the first ratchet gear by a rotational operation of the first operating lever in the direction of rolling up the positioning cord and so as to be unlocked from the first ratchet gear by a reverse rotational operation of the first operating lever in the direction of drawing out the positioning cord; and the second ratchet mechanism is composed of a second ratchet gear fixed to the other end of the rotary shaft, a second pawl rotatably provided at the fixed side, a spring provided for pulling the second pawl to lock the second pawl with the second ratchet gear thereby allowing the roll-up drum to rotate only in the direction of rolling up the positioning cord, and a second operating lever provided at the second pawl so that the second pawl is unlocked from the second ratchet gear against a resilient force of the spring by a rotational operation of the second operating lever.

\* \* \* \* \*